Oct. 23, 1956  V. H. HASSELQUIST  2,767,769
HEAT-SEALING THERMOPLASTICS
Filed Oct. 20, 1953  4 Sheets-Sheet 1
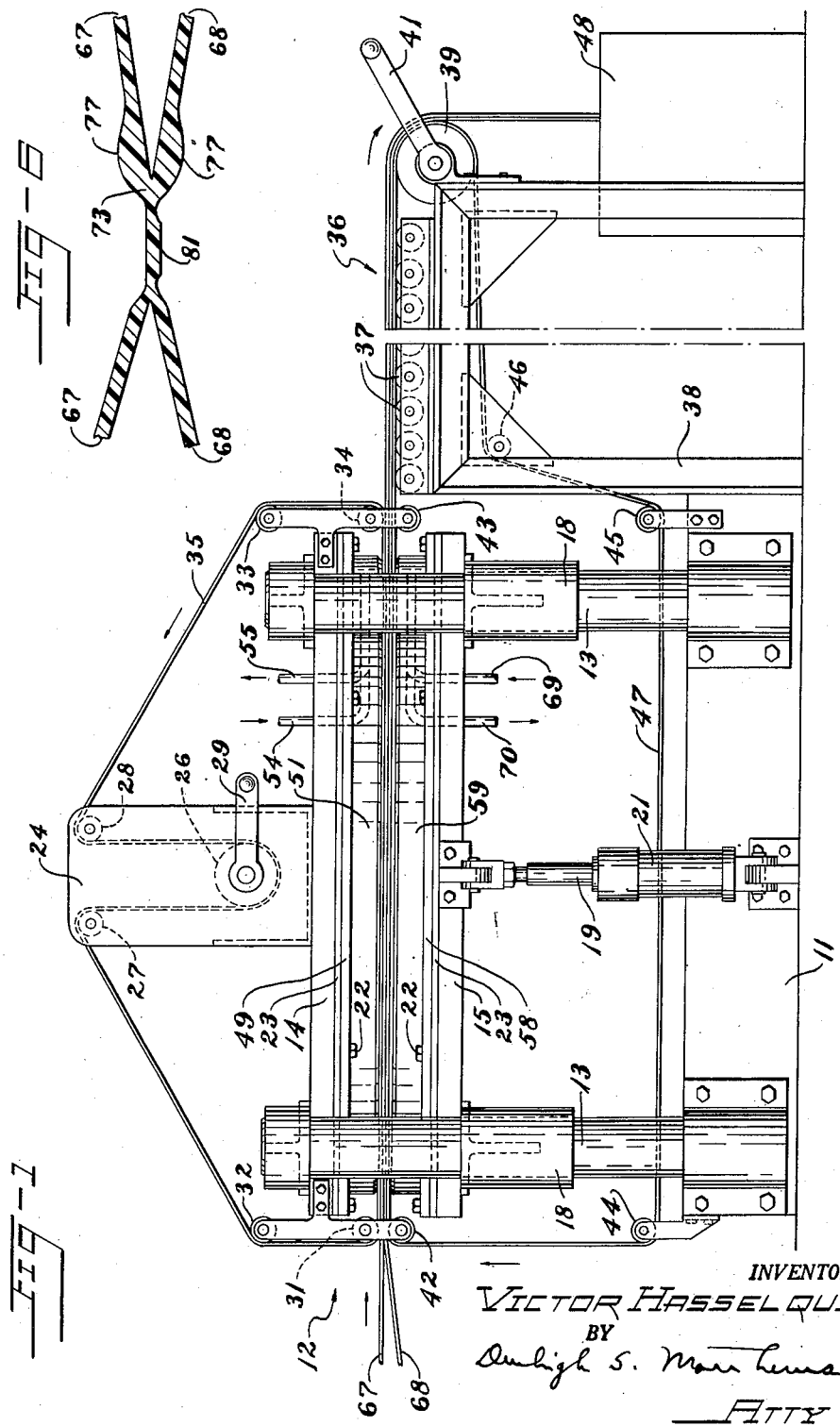
INVENTOR.
VICTOR HASSELQUIST
BY
ATTY

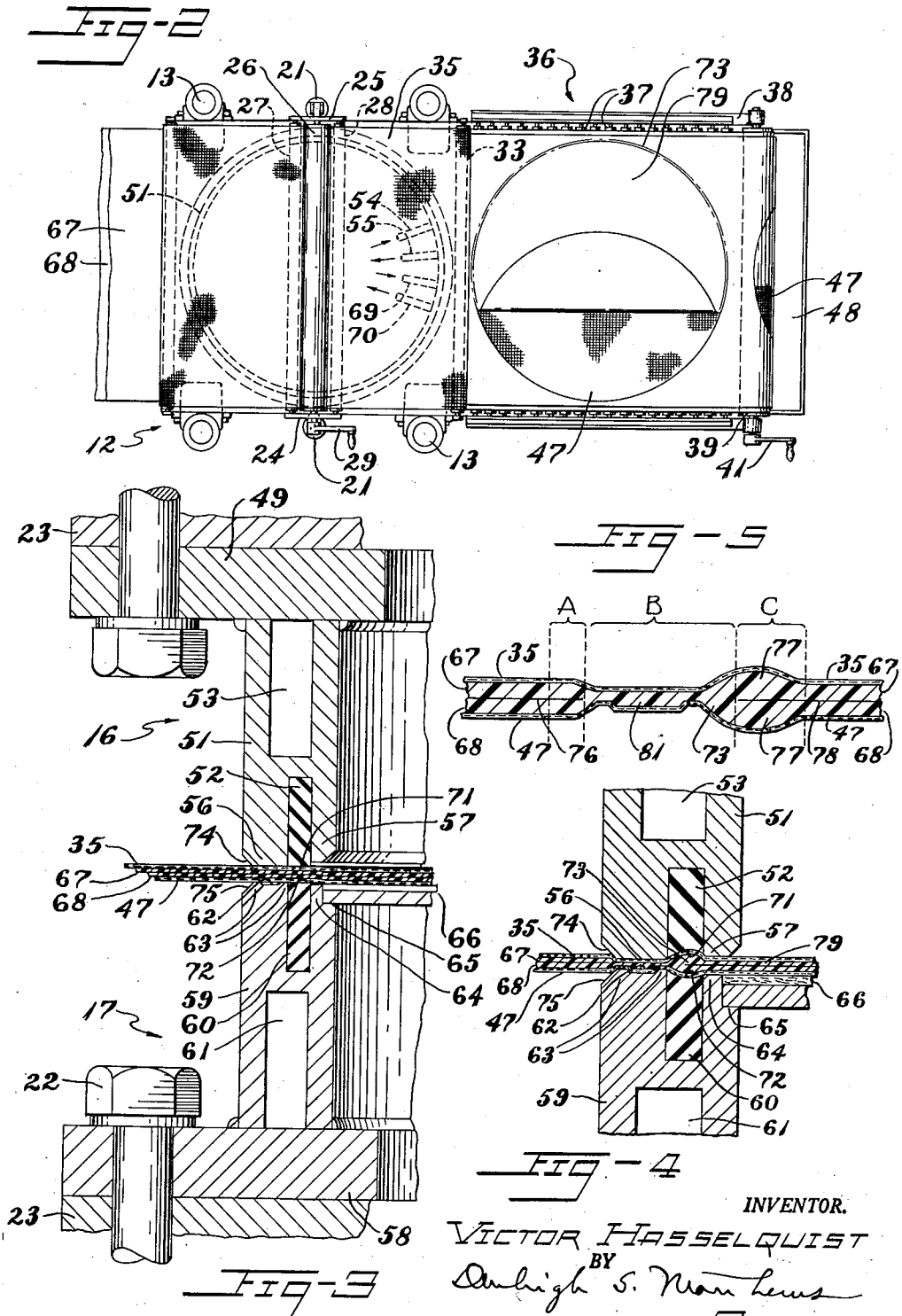

Oct. 23, 1956 V. H. HASSELQUIST 2,767,769
HEAT-SEALING THERMOPLASTICS
Filed Oct. 20, 1953 4 Sheets-Sheet 3
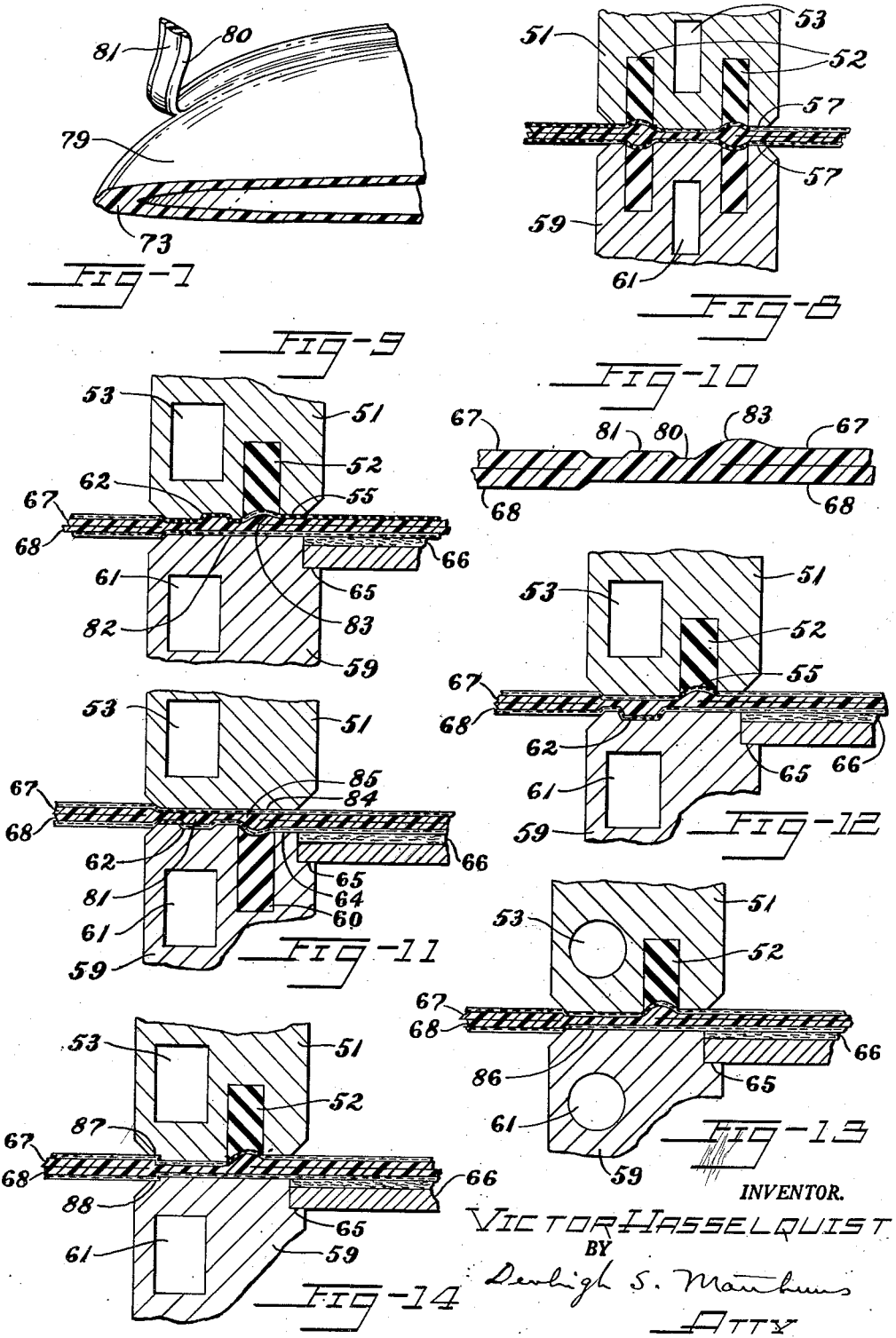
INVENTOR.
VICTOR HASSELQUIST
BY
Denligh S. Mantins
ATTY Oct. 23, 1956 V. H. HASSELQUIST 2,767,769
HEAT-SEALING THERMOPLASTICS
Filed Oct. 20, 1953 4 Sheets-Sheet 4
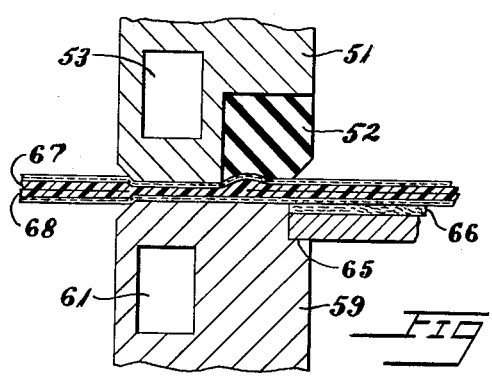
FIG-16
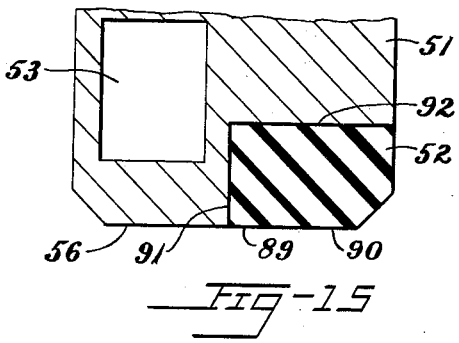
FIG-15
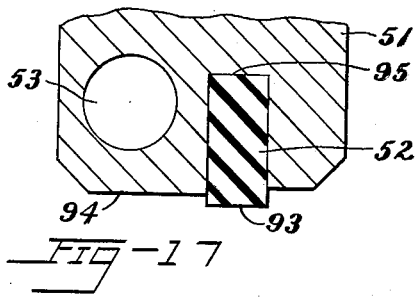
FIG-17
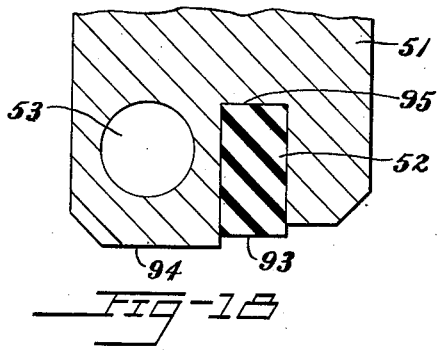
FIG-18
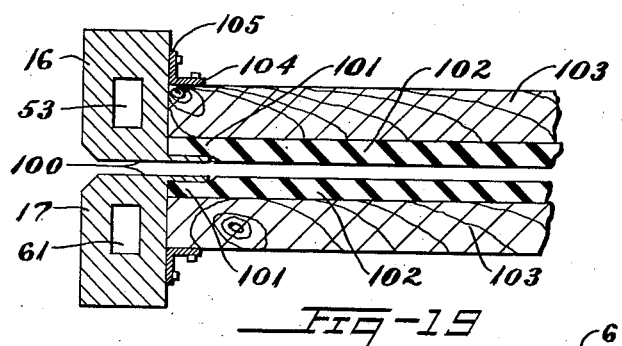
FIG-19
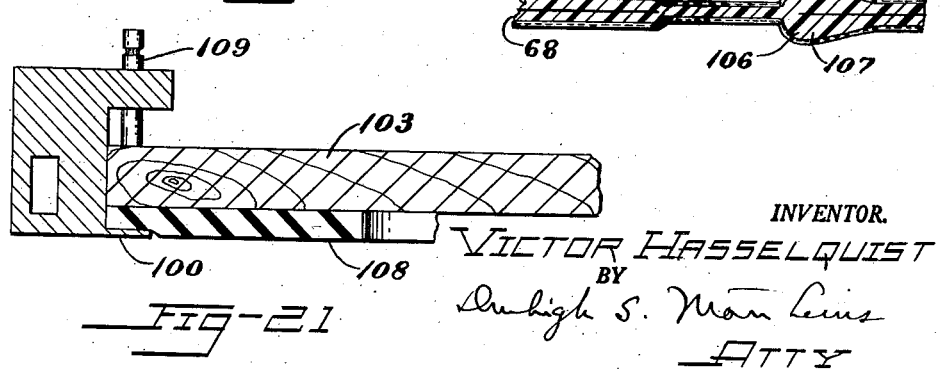
FIG-20
FIG-21
INVENTOR.
VICTOR HASSELQUIST
BY
ATTY United States Patent Office 2,767,769
Patented Oct. 23, 1956

2,767,769

HEAT-SEALING THERMOPLASTICS

Victor H. Hasselquist, Akron, Ohio, assignor to The B. F. Goodrich Company, New York, N. Y., a corporation of New York Application October 20, 1953, Serial No. 387,140

25 Claims. (Cl. 154—42)

This invention relates to heat-sealing contiguous sheets of thermoplastic material by means of the application of heat and pressure. More particularly, it relates to novel methods and apparatus or machines for heat and pressure sealing thermoplastic sheets and to novel articles used therein and produced thereby.

Methods of seaming sheets of thermoplastic material one to another have been devised heretofore, but generally have provided a seam which is reduced in thickness as compared to the combined thicknesses of the sheets before seaming. This reduction in thickness results in low strength seams and in some cases results in the heat softened material being cut through or torn. With such seams it also is difficult to separate several seamed articles from each other without tearing them.

It, therefore, is an important object of this invention to provide a strong seam in a thermoplastic material, the seam being formed by the application of heat and pressure only.

It is another object to provide a seam which is of a greater thickness than the combined thicknesses of the sheets to be seamed together without the use of any material not contained in the sheets.

It is also an object to provide a seam in a plurality of sheets of thermoplastic material in such a manner that the thermoplastic material at a side of the seam may be trimmed by merely hand peeling the material away without the aid of machine or instrument.

Still another object of this invention is to provide heat-sealing apparatus useful in forming strong seams between plastics.

A further object of the present invention is to provide dies for heat-sealing apparatus, useful in forming strong seams between plastics.

A still further object is to provide methods for producing strong seams between plastic materials.

These and other objects and advantages of the present invention will become more apparent from the following detailed description, examples and drawings in which:

Fig. 1 is a side view in elevation of an entire apparatus utilizing this invention including a conveyor system for moving the sheets to be treated through the apparatus;

Fig. 2 is a plan view of the apparatus of Fig. 1;

Fig. 3 is a detailed view partly in section of the die members and platens in the position used during the heating cycle;

Fig. 4 is an enlarged detail view of the die members showing the rubber inserts distorted during the pressure step;

Fig. 5 is a vertical, enlarged cross sectional view showing the appearance of the seamed thermoplastic sheets covered with Holland cloth;

Fig. 6 is a vertical, enlarged cross sectional view of the seam, web and rind between two thermoplastic sheets;

Fig. 7 is a perspective view of a segment of the thermoplastic material which has been seamed and trimmed;

Fig. 8 is an enlarged detail view of another embodiment of the invention, the die members having two pairs of rubbery inserts;

Fig. 9 is an enlarged vertical sectional view of another embodiment of the invention where only the upper die member has a rubbery insert and trough;

Fig. 10 is a vertical cross sectional view of the type of seam obtained using the apparatus of Fig. 9;

Fig. 11 is an enlarged vertical sectional view of still another embodiment wherein only the lower die member contains the elastic material and trough;

Fig. 12 is an enlarged vertical sectional view of yet another embodiment in which the rubber insert is in one die member and the trough in the other;

Fig. 13 is an enlarged vertical sectional view of yet another embodiment in which the resilient member is in one die and the cooperating die has a flat pressing surface;

Fig. 14 is an enlarged vertical sectional view of still another embodiment where the die members contain engaging means on their outer portions;

Fig. 15 is an enlarged vertical sectional view of a die containing a pressing portion and a resilient portion for molding and holding;

Fig. 16 is an enlarged vertical sectional view showing the use of a cooperating die with the die of Fig. 15;

Fig. 17 is an enlarged vertical sectional view of a die member wherein the contact surface of the resilient portion extends out from the surface of the plane of the pressing portion;

Fig. 18 is an enlarged vertical sectional view of a die wherein the plane of the contact surface of the resilient portion lies below that of the pressing portion;

Fig. 19 is a detailed view partly in section of another embodiment of the present invention showing means for securing the resilient means to the pressing means;

Fig. 20 is a vertical cross sectional view of the type of seam obtained when employing the apparatus of Fig. 19; and Fig. 21 is a vertical cross sectional view of a modification of the die member of Fig. 19.

I now have discovered that a thick seam for combining thermoplastic sheets can be provided by using properly designed apparatus for heating and pressing the thermoplastic sheets momentarily. I have found that by using a pressure foot having an active surface which is partly rigid and contains heat transfer means and partly flexible and yieldable, it is possible to heat-seam thermoplastics sheets together with a resulting seam which is considerably thicker than the combined thicknesses of the sheets themselves.

In general, according to the present invention the die member comprises rigid engaging and pressing means of steel or other hard substance having heat transfer means such as a cavity near its surface for contacting, heating and pressing the thermoplastic material. Adjacent the rigid means is flexible and yieldable means of rubber or rubber and cloth such as Holland which receives a portion of the plastic when molten and is deformed to substantially concave shape to form a seam. Further, it exerts sufficient pressure to deform another portion of the plastic adjacent the seam to provide thickened areas between the seam proper and the body of the plastic sheets. Adjacent the flexible and yieldable means is an engaging member which does not exert sufficient pressure on the plastic sheets to deform them as its surface is out of the plane of that of the rigid engaging and pressing means but does exert sufficient pressure to hold them. A cavity or trough opening to the surface of the rigid engaging and pressing means may be provided therein to form a rind in the layers of plastic adjacent the seam.

The invention can best be described by means of a specific example which will be discussed with reference to the accompanying drawing, Figs. 1 to 4, where the preferred apparatus is illustrated. It comprises base member 11 which may rest upon the floor and upon which is mounted hydraulically operated press 12 having four vertical guide posts 13, 13 and platens 14, 15. Mounted on the lower face of upper platen 14 is the ring die member 16 and mounted on the upper face of lower platen 15 is ring die member 17. The die members 16, 17 are complementary one to the other, having like diameters and thicknesses. Lower platen 15 slidably engages the guide posts 13 through sleeves 18, 18, while upper platen 14 is secured in a fixed position near the top of the guide posts 13, 13 as shown in Fig. 1.

The piston 19 of each of two hydraulic cylinders 21 is linked with lower platen 15 and the hydraulic cylinders themselves are secured to the base member 11. The hydraulic cylinders 21 are actuated by conventional means such as a pump to move platen 15 upward and downward as desired. Ring die member 16 is secured to platen 14 by cap screws 22, 22 with a plate 23 of heat insulating material interposed between the ring die and platen.

Mounted on the upper platen 14 are trunnion plates 24, 25 between which are mounted rolls 26, 27 and 28. The shaft of roll 26 is fitted with a crank 29. Along with guide rolls 27, 28 the guide rolls 31, 32, 33 and 34, which are also mounted on platen 14, determine the path along which the endless Holland cloth belt 35 travels.

The conveyor 36 is adjacent to the press 12 and is so constructed that the trunnioned rollers 37 are at the same height as the upper face of the lower die member 17 when the die members 16 and 17 are in contact as shown in Fig. 1. The conveyor 36 consists of a 4-legged stand 38 upon which are the rollers 37 and roll 39, the shaft of which is provided with a crank arm 41. Upon the same hanger assembly which supports roll 31 is mounted roll 42, and upon the hanger assembly of roll 34 is mounted roll 43. Rolls 44 and 45 are secured to the base member 11 as indicated in Fig. 1. Roll 46 which is mounted on the 4-legged stand 38 completes the series of rolls 42, 43, 39, 46, 45, 44 over which a second endless Holland cloth belt 47 is threaded.

At the end of the conveyor 36 and immediately below roll 39 is salvage container 48.

Die member 16 consists of a flange member 49 which is welded to the ring member 51 as indicated in Fig. 3. Ring member 51 is provided with two cavities, one of which is filled with a ring 52 of heat-resistant, elastic, resilient rubbery composition vulcanized in situ in said cavity or secured to the walls thereof by cement and the other of which remains unfilled but is closed off by flange member 49 to form steam passage 53 which has an inlet 54 and outlet 55. The contact end or surface of die member 16 is not symmetrical in cross-section as can be seen in Fig. 4. It contains a material engaging and pressing portion 56, the resilient member 52 to which reference has already been made, and a material engaging portion 57. The contact surface of 57 may be covered with masking tape or other insulation if desired.

Die member 17 likewise consists of a flange member 58 welded to ring member 59. Ring member 59 is provided with three cavities, the rubbery ring 60 also secured to the walls of its cavity by vulcanizing in situ or by cement, steam passage 61 of ring member 59 which is directly opposite the like portions of ring member 51, and shallow channel or trough 62 in the upper or sealing face of ring member 59 outwardly of rubbery ring 60. Around the trough are engaging and pressing surfaces 63, 63. The inner portions 57, 64 of the mating faces of ring members 51, 59 are cut back so that when the die members are brought together, the outer portions actually make contact with the intervening layers of material but the inner portions of the respective die members do not make contact, as shown in Fig. 3 prior to the time the thermoplastic material is pressed and heated. Ring member 59 is cut away at its inner margin to provide shoulder 65 so as to support the asbestos covered plate 66 which is of steel or other strong material which supports the Holland cloth belts 35, 47 and thermoplastic sheets 67, 68 within the ring members 51, 59. Steam passage 61 is provided with inlet 69 and outlet 70.

In using this apparatus, two sheets of thermoplastic material 67, 68 are fed through the press 12 between Holland cloth belts 35 and 47. Continuous lengths of thermoplastic material may be employed, the finished article being separated from any excess material after the sealing operation. The die members 16, 17 are brought towards each other by actuating hydraulic cylinders 21, 21. As shown in Fig. 3, the die members 16 and 17 bring the thermoplastic sheets 67, 68 together between the Holland cloth belts 35, 47 but no distortion of the thermoplastic sheets takes place at this stage.

At this time the outer portion 56 of the mating face of ring member 51 and the lower face 71 of rubber ring 52 are flush with each other, the surfaces of both contacting the Holland cloth belt 35. Likewise, the mating faces 63, 63 around cavity 62 of ring member 59 and the upper face 72 of rubber ring 60 are flush. The rubber ring members 52, 60 grip the Holland cloth and thence the thermoplastic sheets 67, 68 to prevent any substantial shrinking of that section of the thermoplastic sheets which lies upon plate 66 within the area formed by the ring members during the heating step which follows.

Steam or other suitable heating fluid is introduced into steam cavities 53 and 61 through inlet lines 54, 69 and the steam or its condensate is removed through outlets 55, 70.

The portions of thermoplastic sheets 67, 68 underlying sealing face 56 of ring member 51 are heated until the material becomes soft and flowable, whereupon hydraulic cylinders 21, 21 are actuated to apply pressure at the mating faces of ring members 51 and 59 to force them closer together while the contact surfaces or faces of the inner portions 57 and 64 of the mating faces of ring members 51 and 59 now contact the sheets of thermoplastic material to hold them without appreciable distortion and to prevent them from slipping and wrinkling. The pressure applied (about 50 p. s. i.) is sufficient to cause the softened thermoplastic material which underlies sealing face 56 to flow. A portion of the material flows into annular channel or cavity 62 while another portion flows to the right, as seen in Fig. 4 to press against the elastic rings 52 and 60. Since the material between cutaway portions 57, 64 is not heated sufficiently so that it will flow appreciably, it serves as a dam or barrier, confining the molten material between the opposing faces of rubbery members 52, 60, which being yieldable, are compressed somewhat to form a generally arcuate, concave surface and allow the molten material to form a seam 73 between sheets 67, 68 which is somewhat thicker than the combined thickness of the original sheets, as shown in Fig. 4. Fig. 5, wherein the die members have been removed, and the plastic sheets and Holland enlarged somewhat, illustrates better the mechanism by which it is believed the novel seam of the present invention is obtained. The assembly of Holland cloth sheets 35 and 47 and thermoplastic sheets 67 and 68 immediately adjacent the hot faces of the ring members 74 and 75 is warmed sufficiently so that the thermoplastic sheets may be deformed but are not sufficiently hot so that they will fuse together. The parting line 76 shows that these sheets 67 and 68 are separable through the deformable zone A to the edge of zone B. The sheets also form a dam to prevent loss of molten material. In zone B, the plastic sheets have been heated to a temperature sufficiently high so that they are molten and fuse together.

Under the pressure applied between the faces of the ring members 51 and 59, a portion of the molten thermoplastic is displaced or forced into the area underlying the resilient members 52 and 60 to compress and/or deform them and provide an enlarged, rounded fused mass of thermoplastic material which is the seam 73. During this process, the flexible, semi-extensible Holland is likewise forced into a configuration similar to that of the thermoplastic. The thermoplastic material forming the sheets in this area may be entirely intermingled or joined at their interfaces depending on the heating time, pressure applied, and turbulence created. In either event an enlarged, strong seam is obtained. In the area represented by zone C, the plastic material is still sufficiently hot to be deformable as in zone A and accordingly to press against a portion of the resilient members to form enlarged areas 77, 77 adjacent the seam 73 and tapering toward the main body of the sheets 67 and 68. However, in this zone the thermoplastic sheets are not sufficiently hot to fuse together at their interfaces nor to intermingle so that they can be separated as indicated by the parting line 78. Fig. 6 shows a section through the area of joinder wherein the Holland sheets have been removed and the ends of the plastic sheets pulled apart slightly to show their structure at the seam. It will be understood that on release of pressure and/or cooling the Holland will retain the shape imparted to it during the pressing and heating operation for a sufficient period of time so that no subsequent change in the shape of the seam occurs as it solidifies or cools.

The seam thus formed may be removed from the press immediately if an air blast is used, or if desired it may be cooled in the press by passing a cooling fluid through passages 53 and 61. The press is opened by actuating hydraulic piston 19, and crank 41 is turned to advance the seamed sheets, while still resting on belt 47, over conveyor rolls 37 and draw a fresh portion of sheet material 67, 68 between die members 16, 17. The circular article 79 bounded by seam 73 is still joined to the remainder of the sheet material by a very thin web 80 of thermoplastic material extending around the outer margin of seam 73 between it and the thickened portion or rind 81 formed in channel 62. The seam 73, web 80 and rind 81 tend to adhere slightly to belts 35 and 47 with which they were in contact during the heating step, but are readily stripped from upper belt 35 as it passes around roll 34.

The seamed article may then be separated from sheets 67, 68 simply by manually tearing along thin web 80 and then the completed article can be removed from the lower belt. The seam so produced, as shown in Fig. 7, requires no further trimming or finishing operations.

The scrap thermoplastic sheet material from which the circular product 79 has been removed separates from Holland cloth belt 47 at roll 39 and then drops into the salvage container 48.

The thermoplastic sheets 67, 68 may be conveniently supplied on rolls which would be located on the opposite side of the press from the container 48, although these rolls are not shown. The thermoplastic sheets are advanced through the press stepwise as the seams are formed.

Examples of the heating and pressing cycles, including times, temperatures and pressures used when seaming 0.015" plasticized polyvinyl chloride sheets, are as follows:

*Example I*

1. Heat for 10 to 15 seconds at 350° F. (platens together but no pressure).
2. Press for 3 seconds at 50 p. s. i. and immediately open press and remove seamed sheets.

In one modification of the invention, it has been found worthwhile to use passages 53, 61 as coolant chambers in addition to steam passages.

*Example II*

1. Heat for 25 seconds at 350° F. (platens closed but no pressure).
2. Press for 3 seconds at 50 p. s. i.
3. Cool for 25 seconds with no pressure on platens and remove seamed sheets.

The seam which is formed by such an apparatus is actually greater in thickness than the combined thicknesses of the two thermoplastic sheets being seamed together. For instance, in Fig. 7 each of the two sheets of the thermoplastic are 0.015" thick, and the seam at its thickest portion is 0.050", with the individual sheets tapering in thickness from the crotch of the seam to their original 0.015" thickness at a distance of about ¼ of an inch from the seam proper.

Because of this configuration the seam is much stronger than those normally formed by application of heat and pressure, the usual seam being of lesser thickness than the sheets themselves. The seam has no jagged, sharp corners but is of generally rounded shape thereby affording little opportunity for catching or tearing. Further, as the layers of thermoplastic material begin to thicken as they approach the crotch area, and as this area and that just beyond are thicker than the combined thicknesses of each sheet of thermoplastic, a greater increase in strength is imparted to the seam than would be the case where both sheets at the original thickness terminated at the seam. This thick seam is also advantageous in that the unfused material next to the seam will tear before the seam itself; therefore, if it is desirable to trim the material adjacent to one side of the seam, it is possible to trim the material with little danger of tearing or in any other manner destroying or weakening the seam.

Obviously, many other variations may be made in the size and configuration of the die members. Electric motors may be used to drive the rollers instead of cranks. Any number of straight or curved seams may readily be formed simultaneously, and two, three or more sheets of thermoplastic may be joined together by means of this invention.

By using die members having more than one pair of rubbery material rings, i. e., each die member having two or more rubbery rings one beside the other as disclosed in Fig. 8, it is possible to form two side-by-side seams simultaneously so as to obtain a seamed product on both sides of said die member. The thin section of material remaining between the seams is easily torn to form two articles already trimmed.

Moreover, as shown in Fig. 9, the ring member of the upper die can contain trough 62 and resilient insert 52 whereas the lower ring member can have a flat engaging and pressing surface 82 and shoulder 65 for supporting the asbestos covered plate 66. In this embodiment of the invention the heated and pressed plastic will readily flow into the trough 62 and against the resilient material 52 to form a seam 83 of greater thicknesses than the combined thickness of the thermoplastic sheets. The thermoplastic sheets at both ends of the dies serve to confine or dam the molten and plastic material. The seam obtained is rounded on one side but its thickness is greater than the combined thicknesses of the unpressed, unheated portions of the thermoplastic sheets as shown in Fig. 10. Further, the sheet increases in thickness from the unpressed portion to the crotch and seam. Although the seam is not symmetrical it is substantially as strong as that shown in Fig. 7 and at least one plastic sheet increases in thickness as it approaches the crotch area of the seam.

The arrangement shown in Fig. 11 is somewhat similar to that shown in Fig. 9 except that the upper ring member of the die has a flat engaging and pressing face 84 whereas the lower die ring member contains the trough 62, resilient material 60, holding portion 64 and shoulder 65. Similarly the unfused sheet material at either end helps to dam the molten and/or plastic material in order to fill the trough to form a rind 81 and seam 85.

In Fig. 12, the resilient member 52 is contained in the upper ring die member and the trough 62 is in the lower ring member. It will be understood that the trough or resilient material can be in either die ring member with achievement of the same results. In either case a rind is formed adjacent the seam which has a total thickness greater than that of the thermoplastic sheets.

Fig. 13 shows an arrangement of apparatus wherein the upper die ring member contains only the resilient member 52 and neither ring contains a trough. The molten plastic material will still flow to deform the resilient material and provide a seam of greater thickness than the two combined sheets as the unfused sheets of plastic at either end will form a dam and prevent outward flow. The thin section 86 adjacent the seam can be readily separated therefrom when removing the sealed articles from the unfused sheet material. Obviously, the arrangement of the resilient member in the dies can be reversed with achievement of the same results.

Both upper and lower die ring members 51 and 59, Fig. 14, have been cut away at their outer ends 87—88 to provide means for gripping the sheets securely to provide additional damming action during hot pressing without distortion of the sheets. While the resilient member is shown in the upper die ring 51, it could be located in the lower die ring member 59 with obtainment of the same results.

Fig. 15 shows the use of a die ring member containing only the engaging and pressing portion 56 and the resilient member 52. In operation, as disclosed in Fig. 16, lower die ring member 59 will exert sufficient pressure in conjunction with the upper die ring member to force the liquid against the contact surface 89 of the resilient material to form a cavity for the molten plastic while the surface 90 of the remainder of the resilient material will remain substantially undeformed but under sufficient pressure to hold the sheets against wrinkling. In this embodiment of the invention the resilient material is not positioned in a cavity opening only to the working surface of the die but is secured to undercut walls 91—92 by cement or rivets and is sufficiently restrained to exert the required pressure. It is understood that a similar die ring member may be used for the lower die in the pressing apparatus rather than a die presenting a flat pressing surface as shown. Further, ring member 51 may contain a trough (not shown) and/or ring member 59 may contain a trough or resilient insert (both not shown in this particular embodiment).

The plane of the work contact surface 93 of the resilient material 52 may also extend slightly beyond the plane of the pressing surface 94 of the die ring member while the surface 95 of its base is below the surface 94. This structure is shown in Fig. 17. This serves to additionally hold the thermoplastic sheets as the dies are brought together. During the pressing and heating steps, the resilient material will be deformed to take a generally rounded shape. In Fig. 18 the contact surface 93 and base surface 95 of the resilient member lie below or somewhat within and away from the contact surface 94 of the ring member. In this embodiment Holland or similar cloth is necessarily employed with the rubber insert so that the seam formed will be as smooth as heretofore described. Without the Holland, a completely rounded edge at the end of the seam where it touches the web will not be formed although such is not unacceptable. The Holland which is flexible and the rubbery insert adjacent thereto provide therefore the preferred elastic resilient means for forming the required seam.

A still further embodiment of the present invention is shown in Fig. 19, wherein the ring die members 16 and 17 each contains an elongated, thin pressing member or lip 100 extending from and forming a part of the engaging and pressing surface of the die member. This member is in heat transfer relationship with the main portion of the rings 16 and 17 and extends around the inner circumference of the dies. The end 101 of a circular rubber blanket 102, extending throughout the area enclosed by the ring, is pressed by said member against the under surface of an insulating member 103 secured to the die member by means of an L-shaped member 104 and bolts or screws 105, 105. The rubber is compressed in the area defined by parts 100 and 103. The insulating member may be of wood, refractory composition and the like and serves to insulate the rubber blanket from the heat and prevent its deterioration and distortion. The means of forming a seam between thermoplastic sheets is the same as described supra. In operation the rubber is distorted or compressed inward to form the seam having a generally concave surface. Fig. 20 discloses the shape of the seam 106 obtained by using this apparatus. Although its surface is not truly parabolic as formed with other resilient members, it offers no sharp angled surfaces for tearing or ripping and the seam is thicker than the combined thicknesses of the individual sheets. It will also be noted that at the crotch portion 107 the thicknesses of the sheets taper down to the original thickness of the individual sheets which were not under the die members. If Holland or other suitable cloth is not used, the surface of the seam will not be completely round. Fig. 21 discloses apparatus essentially similar to that of Fig. 19 except that a rubbery ring 108 is used between the lip 100 and the insulating member 103 instead of a rubber blanket. A set screw 109 is also provided to hold the insulating member and clamp it and the ring against the lip 100.

The materials used in the several elements of the apparatus described may be chosen from a large number of materials which are suitable. For instance, the rubber rings may be constructed or molded from any suitable heat-resisting rubber composition or from a suitable rubber substitute such as "silicone rubber" or the like. The rubber ring may also be of cellular rubber such as sponge rubber, preferably closed cell and dense. The ring members may be steel alloys or other suitable metals or alloys of metals or any other material having the necessary strength and heat-conductivity properties. The channel within which the rind 81 is formed may be located in both ring members or in one, as illustrated.

Electric heating elements of the resistance type can be used instead of steam. However, the use of a cavity or similar means to obtain rapid heating with steam and cooling with water is preferred. Preferably, the heat transfer means is positioned as close as possible to the rigid pressing portions (56, 62, and 63) to afford rapid heat conduction or transfer. From a practical standpoint a heating element is required in each die member to supply sufficient heat for deforming and fluidizing. Only when very thin sheets are used will one heating element for both die members be adequate.

The Holland cloth belts can be replaced with cotton or other suitable non-sticking materials such as polyester resin fiber impregnated glass, micarta, Teflon, or the belts may be eliminated altogether if the die members are cooled before the seamed product is removed. Preferably, the elastic means is vulcanized or cemented to the walls of its cavity particularly at its outer edges where the faces of the pressing and engaging member and elastic pressing and engaging member touch. Otherwise, Holland or similar flexible material is required to prevent formation of gaps between the rubber and the wall of the cavity if the rubber is merely clamped in the cavity or press fitted. Such gaps if Holland is not used will form a seam of irregular surface. Although such seam is acceptable, a rounded surface is preferred.

While this invention has been particularly described with reference to the formation of seams in thermoplastic material such as polyvinyl chloride, it is obvious that it can be used for other thermoplastic materials and even for rubber and other plastic materials. Further, while it is unnecessary to use a cement herein, it is obvious that such can be employed if desired.

This application is a continuation-in-part of my prior copending application S. N. 232,904, filed June 22, 1951, entitled "Forming Heat-Sealed Seams in Thermoplastic Sheets and Apparatus Therefor," now abandoned.

Other variations may be made within the spirit and scope of the following claims.

I claim:

1. An apparatus useful in heat-sealing thermoplastic materials comprising rigid material engaging and pressing means including a rigid substantially planar contact surface, said rigid material engaging and pressing means containing means adjacent to and rearwardly of the rigid contact surface thereof for heating said rigid surface thereby to heat and soften said thermoplastic material, and at least one elastic, heat-resistant and flexible material engaging and pressing means adjacent to and restrainably supported by said rigid material engaging and pressing means, said elastic means having a substantially planar contact surface yieldably deformable below the plane of the contact surface of said rigid means to form a substantially arcuate, concave surface and to yieldably restrain the flow of heated and pressed thermoplastic material to form a relatively thick seam.

2. An apparatus comprising a die useful in joining sheets of thermoplastic material along a narrow zone thereof having a rigid material engaging and pressing member including a rigid planar contact surface for pressing said thermoplastic material, said rigid material engaging and pressing member containing means adjacent to and rearwardly of the rigid planar contact surface for heating said rigid surface thereby to heat and soften said thermoplastic material, and at least one elastic, heat-resistant, flexible, resilient and yieldable material engaging and pressing member adjacent to and restrainably supported by said rigid member, said elastic member having a substantially planar contact surface yieldably deformable below the plane of the contact surface of said rigid member to form an arcuate, concave surface and to yieldably restrain the flow of heated and pressed thermoplastic material of said sheets to form a seam joining said sheets together in said zone, having a thickness greater than the combined thicknesses of said sheets and having a substantially arcuate surface on at least one side.

3. An apparatus according to claim 2 wherein the plane of the contact surface and of the base surface of said elastic member lie below the plane of the contact surface of said rigid material engaging and pressing member.

4. An apparatus according to claim 2 wherein the plane of the contact surface of said elastic member lies above and the plane of the base surface of said elastic member lies below the plane of the contact surface of said rigid material engaging and pressing member.

5. An apparatus according to claim 4 containing additionally a rigid material engaging member and wherein said elastic member is disposed in a cavity between said rigid material engaging and pressing member and said rigid material engaging member.

6. An apparatus according to claim 2 wherein the contact surfaces of said rigid material engaging and pressing member and said elastic member are essentially in the same plane.

7. An apparatus according to claim 6 containing additionally a rigid material engaging member adjacent said elastic member.

8. An apparatus according to claim 7 wherein said rigid material engaging member contains a shoulder for supporting an insulated support for thermoplastic material and said elastic member is contained in a cavity between said rigid material engaging and pressing member and said rigid material engaging member.

9. An apparatus according to claim 7 wherein said rigid material engaging and pressing member contains a shallow trough opening to its rigid planar contact surface.

10. An apparatus according to claim 9 wherein said rigid material engaging member contains a shoulder for supporting an insulated support for said thermoplastic material.

11. An apparatus according to claim 10 wherein said elastic member is contained in a cavity between said rigid material engaging and pressing member and said rigid material engaging member.

12. In an apparatus useful for heat seaming thermoplastic material, a pair of opposing rigid dies adapted to receive said thermoplastic material and movable relative to each other to press said thermoplastic material, at least one die comprising rigid material engaging and pressing means including a rigid substantially planar contact surface to press against and cause said material to flow laterally when heated, said rigid material engaging and pressing means containing means adjacent to and rearwardly of the rigid contact surface for heating said rigid contact surface thereby to heat and soften said thermoplastic material, and at least one elastic, heat-resistant and flexible material engaging and pressing means adjacent to and restrainably supported by said rigid material engaging and pressing means, said elastic means having a substantially planar contact surface yieldably deformable below the plane of the contact surface of said rigid means to form an arcuate, concave surface and to yieldably restrain the flow of heated and pressed thermoplastic material and cause the building up of a relatively thick seam of said thermoplastic material.

13. Apparatus useful for heat seaming a plurality of sheets of thermoplastic material along a narrow zone thereof by the application of heat and pressure comprising a pair of opposing rigid dies adapted to receive said material between them, at least one die comprising a rigid material engaging and pressing member including a rigid planar contact surface, said rigid material engaging and pressing member containing means adjacent to and rearwardly of the rigid planar contact surface for heating said rigid surface thereby to heat and soften said thermoplastic material in said zone, at least one elastic, flexible, resilient, heat-resistant and yieldable material engaging and pressing member adjacent to and restrainably supported by said rigid member, the other die containing a rigid material engaging and pressing member containing means adjacent to and rearwardly of its planar contact surface for heating said surface also thereby to heat and soften said thermoplastic material in said zone, and means to move said dies relative to each other to contact and press said thermoplastic material in said zone, said elastic member having a substantially planar contact surface yieldably deformable below the plane of the contact surface of said first named rigid material engaging and pressing member to form a substantially arcuate, concave surface and to yieldably restrain the flow of heated and pressed thermoplastic material and form a seam integrally joining said sheets, having a maximum thickness greater than the combined thicknesses of said sheets and having a substantially arcuate surface on at least one side.

14. Apparatus according to claim 13 wherein the plane of the contact surface and of the base surface of said elastic member lies below the plane of the rigid planar contact surface of said rigid material engaging and pressing member of said first named die.

15. Apparatus according to claim 13 wherein the plane of the contact surface of said elastic member lies above and the plane of the base surface of said elastic member lies below the plane of the contact surface of said rigid material engaging and pressing member of said first named die.

16. Apparatus according to claim 15 wherein said first named die contains additionally a rigid material engaging member and wherein said elastic member is disposed in a cavity between said rigid material engaging and pressing member and said rigid material engaging member.

17. Apparatus according to claim 13 wherein the contact surfaces of said rigid material engaging and pressing member and said elastic member of said first named die are essentially in the same plane.

18. Apparatus according to claim 17 wherein said first named die contains additionally a rigid material engaging member adjacent said elastic member.

19. Apparatus according to claim 18 wherein, in said first named die, said rigid material engaging member contains a shoulder for supporting thermoplastic material and said elastic member is contained in a cavity between said rigid material engaging and pressing member and said rigid material engaging member.

20. Apparatus according to claim 18 wherein, in said first named die, said rigid material engaging and pressing member contains a shallow trough opening to its contact surface.

21. Apparatus according to claim 20 wherein, in said first named die, said rigid material engaging member contains a shoulder for supporting an insulated support for carrying said thermoplastic.

22. Apparatus according to claim 21 wherein, in said first named die, said elastic member is contained in a cavity between said rigid material engaging and pressing member and said rigid material engaging member.

23. Apparatus according to claim 22 wherein said other die in said apparatus contains additionally at least one elastic, heat-resistant, flexible, resilient and yieldable material engaging and pressing member in a cavity adjacent to and restrainably supported by said rigid material engaging and pressing member, said elastic member also having a substantially planar contact surface yieldably deformable below the plane of the contact surface of said rigid material engaging and pressing member to form a substantially arcuate, concave surface, due to fluid thermoplastic material under pressure from said rigid material engaging and pressing members of said dies, and a rigid material engaging member adjacent said elastic member.

24. Apparatus according to claim 23 containing additionally a series of rollers about each of said dies, and fabric belts carried by said rollers and passing between said dies, said belts adapted to carry said thermoplastic sheet materials therebetween.

25. Apparatus for heat seaming thermoplastic materials along a narrow zone thereof by the application of heat and pressure comprising a pair of opposing dies including a rigid contact surface adapted to receive said materials between them, one of said dies comprising a rigid material engaging and pressing member having a shallow trough opening to said contact surface and means adjacent to and rearwardly of its contact surface for heating said surface, at least one elastic, heat-resistant, flexible, resilient and yieldable material engaging and pressing member adjacent to and restrainably supported by and having its contact surface in essentially the same plane as the contact surface of said rigid member, a rigid material engaging member including a shoulder for supporting an insulated support for carrying said thermoplastic material adjacent to and forming a cavity with said rigid material engaging and pressing member for containing said elastic member, the other of said dies comprising a rigid material engaging and pressing member including means adjacent to and rearwardly of its contact surface for heating said surface, at least one elastic, heat-resistant, flexible, resilient and yieldable material engaging and pressing member in a cavity adjacent to and restrainably supported by said rigid material engaging and pressing member, and a rigid material engaging member adjacent said elastic member, means to move said dies relative to each other to contact and press said material, a series of rollers about each of said dies, and fabric belts adapted to carry said thermoplastic materials between said dies carried by said rollers and passing between said dies, said elastic members of each of said dies being yieldingly deformable below the plane of the contact surface of their respective adjacent rigid material engaging and pressing members to form substantially arcuate, concave surfaces due to the flow of heated thermoplastic material under pressure from said rigid material engaging and pressing members of said dies.

References Cited in the file of this patent

UNITED STATES PATENTS

| Number | Name | Date |
| --- | --- | --- |
| 1,691,493 | Osgood | Nov. 13, 1928 |
| 2,200,971 | Sonneborn et al. | May 14, 1940 |
| 2,281,976 | Hansen | May 5, 1942 |
| 2,289,618 | Young | July 14, 1942 |
| 2,392,695 | Rohdin | Jan. 8, 1946 |
| 2,422,725 | Gilfillan | June 24, 1947 |
| 2,423,237 | Haslacher | July 1, 1947 |
| 2,433,176 | Van Epps et al. | Dec. 23, 1947 |
| 2,465,374 | Haman et al. | Mar. 29, 1949 |
| 2,479,375 | Langer | Aug. 16, 1949 |
| 2,517,672 | Jenkins | Aug. 8, 1950 |
| 2,562,540 | Engler et al. | July 31, 1951 |
| 2,577,183 | Denton | Dec. 4, 1951 |
| 2,579,063 | Andrews | Dec. 18, 1951 |
| 2,589,756 | Waters | Mar. 18, 1952 |
| 2,621,704 | Langer | Dec. 16, 1952 |
| 2,631,646 | Gannon et al. | Mar. 17, 1953 |
| 2,632,724 | Lumbard | Mar. 24, 1953 |
| 2,647,072 | Smith | July 28, 1953 |